US012811905B2

(12) United States Patent
Wu et al.

(10) Patent No.: US 12,811,905 B2
(45) Date of Patent: Nov. 24, 2026

(54) INFORMATION PROCESSING METHOD, DEVICE, AND COMPUTER-READABLE STORAGE MEDIUM

(71) Applicant: Lenovo Enterprise Solutions (Singapore) Pte. Ltd., Singapore (SG)

(72) Inventors: Chih Wei Wu, Singapore (SG); Ming Lei, Singapore (SG); Chun Hsiang Chou, Singapore (SG); Chekim Chhuor, Singapore (SG)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 231 days.

(21) Appl. No.: 18/677,432

(22) Filed: May 29, 2024

(65) Prior Publication Data

US 2024/0406133 A1 Dec. 5, 2024

(30) Foreign Application Priority Data

May 30, 2023 (CN) ......................... 202310627926.2

(51) Int. Cl.

| | |
|---|---|
| ***G06F 15/16*** | (2006.01) |
| ***H04L 61/103*** | (2022.01) |
| ***H04L 61/5007*** | (2022.01) |
| ***H04L 61/58*** | (2022.01) |

(52) U.S. Cl.

CPC ........ *H04L 61/103* (2013.01); *H04L 61/5007* (2022.05); *H04L 61/58* (2022.05)

(58) Field of Classification Search

CPC .... H04L 61/103; H04L 61/58; H04L 61/5007

See application file for complete search history.

(56) References Cited

U.S. PATENT DOCUMENTS

| | | | | |
|---|---|---|---|---|
| 10,917,378 | B1 * | 2/2021 | Majhi | G06F 9/45558 |
| 2010/0014416 | A1 * | 1/2010 | Liu | G06F 16/904 370/217 |
| 2014/0044134 | A1 * | 2/2014 | Rajamanickam | H04L 61/5046 370/400 |
| 2016/0050123 | A1 * | 2/2016 | Nishanov | H04L 67/10 709/223 |
| 2017/0279765 | A1 * | 9/2017 | Mudric | H04L 61/5053 |
| 2020/0028902 | A1 * | 1/2020 | Rajagopalan | H04L 67/1051 |
| 2020/0252293 | A1 * | 8/2020 | Rajagopalan | H04L 49/35 |
| 2020/0305301 | A1 * | 9/2020 | Lin | G06F 11/3006 |
| 2021/0255876 | A1 * | 8/2021 | Puhan | G06F 16/1834 |

* cited by examiner

*Primary Examiner* — Duyen M Doan

(74) *Attorney, Agent, or Firm* — ANOVA LAW GROUP, PLLC

(57) ABSTRACT

An information processing method includes, when determining that a target node in a to-be-processed chassis is used as a management node of the to-be-processed chassis, obtaining a virtual address and assigning the virtual address to the target node, notifying a subnet corresponding to the to-be-processed chassis with the virtual address, and performing communication with a target programmable module of the to-be-processed chassis through the target node and management on data of the to-be-processed chassis. The virtual address is used to inform that the target node is the management node.

18 Claims, 7 Drawing Sheets

INFORMATION PROCESSING METHOD, DEVICE, AND COMPUTER-READABLE STORAGE MEDIUM

CROSS-REFERENCE TO RELATED APPLICATION

The present disclosure claims priority to Chinese Patent Application No. 202310627926.2, filed on May 30, 2023, the entire content of which is incorporated herein by reference.

TECHNICAL FIELD

The present disclosure relates to the information processing technology in the computer field and, more particularly, to an information processing method, an information processing device, and a computer-readable storage medium.

BACKGROUND

Currently, for a multi-node chassis without a dedicated chassis management module, a server node management module needs to be selected or designated as a proxy chassis administrator. In general, after the node designated as the chassis administrator is determined, that node needs to take over the management role to manage the multi-node chassis. However, after selecting the node as the chassis administrator, how to seamlessly transfer the chassis administrator role to the node as the chassis administrator and perform management on the multi-node chassis needs to be addressed.

SUMMARY

An aspect of the present disclosure provides a processing method. The information processing method includes, when determining that a target node in a to-be-processed chassis is used as a management node of the to-be-processed chassis, obtaining a virtual address and assigning the virtual address to the target node, notifying a subnet corresponding to the to-be-processed chassis with the virtual address, and performing communication with a target programmable module of the to-be-processed chassis through the target node and management on data of the to-be-processed chassis. The virtual address is used to inform that the target node is the management node.

An aspect of the present disclosure provides an electronic device, including one or more processors, one or more memories, and a bus. The one or more memories store an information processing program that, when executed by the one or more processors, causes the one or more processors to, when determining that a target node in a to-be-processed chassis is used as a management node of the to-be-processed chassis, obtain a virtual address and assigning the virtual address to the target node, notify a subnet corresponding to the to-be-processed chassis with the virtual address, and perform communication with a target programmable module of the to-be-processed chassis through the target node and management on data of the to-be-processed chassis. The virtual address is used to inform that the target node is the management node. The bus is configured to communicatively connect the one or more processors and the one or more memories.

An aspect of the present disclosure provides a computer-readable storage medium storing one or more programs that, when executed by one or more processors, cause the one or more processors to, when determining that a target node in a to-be-processed chassis is used as a management node of the to-be-processed chassis, obtain a virtual address and assigning the virtual address to the target node, notify a subnet corresponding to the to-be-processed chassis with the virtual address, and perform communication with a target programmable module of the to-be-processed chassis through the target node and management on data of the to-be-processed chassis. The virtual address is used to inform that the target node is the management node.

DETAILED DESCRIPTION OF THE EMBODIMENTS

The technical solution of embodiments of the present disclosure is described in detail in connection with the accompanying drawings of embodiments of the present disclosure.

Figure 1:
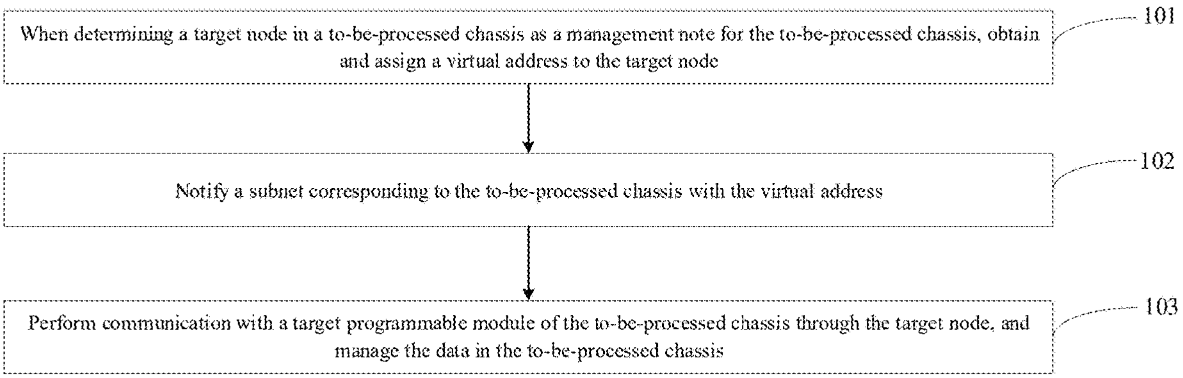
FIG. 1 illustrates a schematic flowchart of an information processing method according to some embodiments of the present disclosure.

Embodiments of the present disclosure provide an information processing method applied to an electronic device. As shown in FIG. 1, the method includes the following steps.

At 101, when determining a target node in a to-be-processed chassis as a management note for the to-be-processed chassis, a virtual address is obtained and assigned to the target node.

In some embodiments, the to-be-processed chassis can refer to a chassis capable of accommodating a plurality of nodes. The target node can refer to a node selected from the plurality of nodes in the to-be-processed chassis capable of performing data processing of the node while managing the data in the to-be-processed chassis. That is, the target node must be in an active state (i.e., capable of processing data normally without any abnormalities) and have sufficient processing capabilities and space.

The virtual address can refer to address information assigned to the node in the to-be-processed chassis used as the node of the management role and used to obtain the management information of the to-be-processed chassis through the target node. In some embodiments, the virtual address can refer to a virtual internet protocol (virtual IP) address. Once a certain node (i.e., the target node) in the to-be-processed chassis is determined as the administrator of the to-be-processed chassis, the virtual address may need to be assigned to the target node. Moreover, once the virtual address is assigned to the target node in the to-be-processed chassis, the target node can be indicated to perform a management operation on the to-be-processed chassis soon. The to-be-processed chassis can be represented as a chassis.

At 102, a subnet corresponding to the to-be-processed chassis is notified with the virtual address.

The virtual address can be used to inform that the target node is used as the management node.

In embodiments of the present disclosure, after the virtual address is assigned to the determined target node, the subnet corresponding to the to-be-processed chassis can be informed with the assigned virtual address. Thus, other nodes corresponding to the subnet can know that the current target node is going to take over the administrator role for the to-be-processed chassis. That is, the target node is the administrator node of the to-be-processed chassis. Thus, other nodes may not compete to become administrator nodes for the to-be-processed chassis anymore to avoid brain splitting. In addition, the other nodes corresponding to the subnet can be accommodated within the to-be-processed chassis.

The virtual address assigned to the target node can be notified to the subnet corresponding to the to-be-processed chassis through target signaling. The target signaling can be a signaling corresponding to a routing protocol. In some embodiments, the target signaling can be a signaling corresponding to the Transmission Control Protocol/Internet Protocol (TCP/IP). In some embodiments, the target signaling can refer to an Address Resolution Protocol (ARP) signaling. By notifying the virtual address to the subnet corresponding to the to-be-processed chassis, the target node can be ensured to smoothly perform the management operation on the to-be-processed chassis to avoid conflicts.

At 103, communication with a target programmable module of the to-be-processed chassis is performed through the target node, and the data in the to-be-processed chassis is managed.

In some embodiments, when the target node manages the data in the to-be-processed chassis, the data management can be implemented through information interaction with the target programmable module in the to-be-processed chassis. The target programmable module can refer to a Programmable System on Chip (PSoC) module. Moreover, the target node can realize a management function for the to-be-processed chassis through a service management module of the target node. In some embodiments, the service management module can refer to a Baseboard Management Controller (BMC). That is, the target node can perform the information interaction with the PSoC of the to-be-processed chassis through the BMC of the target node to manage the data of the to-be-processed chassis.

In embodiments of the present disclosure, the data of the chassis can be managed by the target node, and there is no need to provide a dedicated chassis management module for the chassis to manage the chassis. Thus, the cost can be reduced, and the complexity of the internal structure of the chassis can be reduced, which greatly improves the management efficiency of the chassis.

In the information processing method of embodiments of the present disclosure, the virtual address can be assigned to the determined target node, and the virtual address can be notified to the corresponding subnet to notify the other nodes in the subnet that the target node is currently used as the management node. Based on the target programmable module of the chassis, the data of the chassis can be managed. Thus, the node used as the chassis administrator can take over the chassis administrator role seamlessly and perform the management on the chassis.

Figure 2:
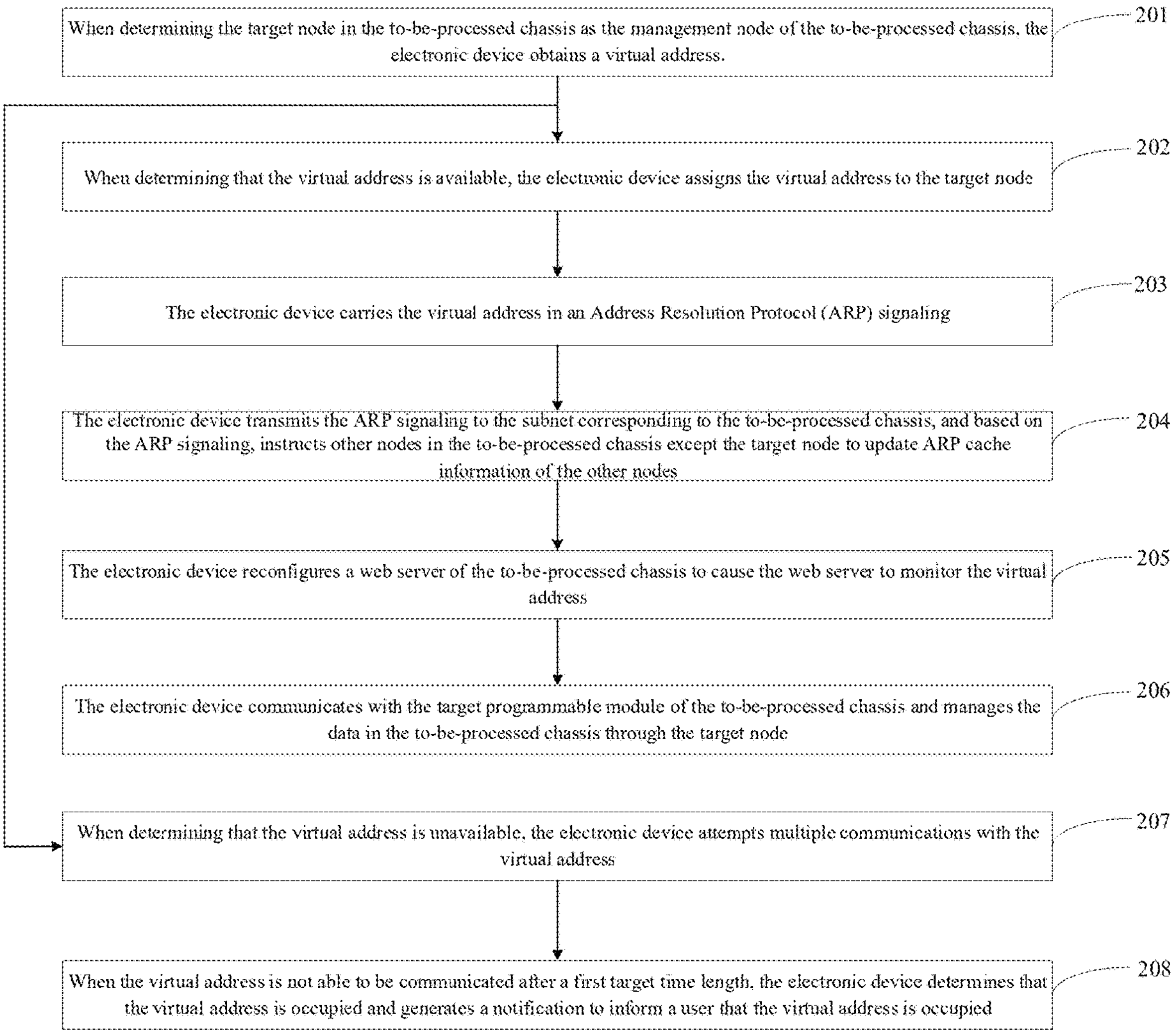
FIG. 2 illustrates a schematic flowchart of another information processing method according to some embodiments of the present disclosure.

Based on the above, embodiments of the present disclosure provide an information processing method applied to the electronic device. As shown in FIG. 2, the method includes the following steps.

At 201, when determining the target node in the to-be-processed chassis as the management node of the to-be-processed chassis, the electronic device obtains a virtual address.

In some embodiments, a virtual IP address (i.e., the virtual address) of each node in the to-be-processed chassis can be determined by setting network information of a BMC module of each node. That is, once the target node in the to-be-processed chassis is selected as the management node, the electronic device can directly obtain the virtual IP address from a local setting.

After step 201, steps 202 to 206 or steps 207 to 208 can be performed.

At 202, when determining that the virtual address is available, the electronic device assigns the virtual address to the target node.

Before assigning the virtual IP address to the determined target node, whether the virtual IP address is currently available may need to be determined. Whether the virtual IP address is currently available can be determined by determining whether the virtual IP address is currently used or whether conflicts currently exist. If the virtual IP address is currently not used or no conflicts currently exist, the virtual IP address can be determined to be available. Then, the obtained virtual IP address can be assigned to the target node. In some embodiments, the obtained virtual IP address can be assigned to a BMC network adaptor of the target node. In some embodiments, whether the virtual IP address is currently available can be determined by "pinging" the virtual IP address based on a received instruction.

Figure 3:
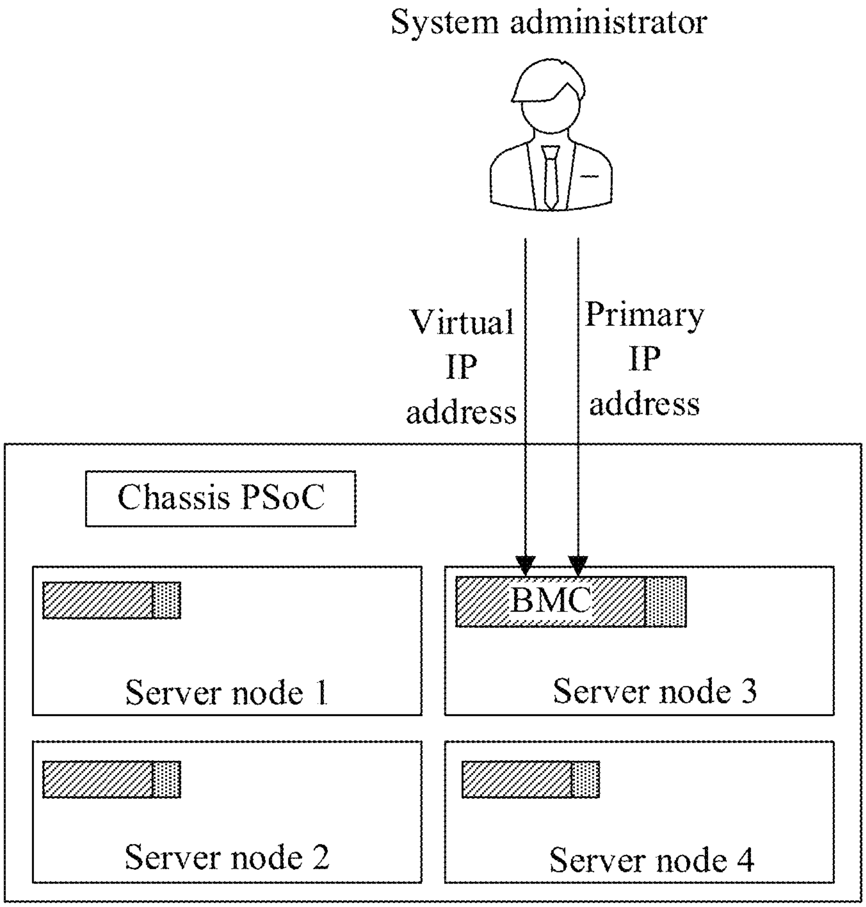
FIG. 3 illustrates a schematic diagram showing a system administrator accessing a machine chassis of an information processing method according to some embodiments of the present disclosure.

In some embodiments, as shown in FIG. 3, if the node refers to a service node, the to-be-processed chassis includes four nodes, including Server node1, Server node2, Server node3, and Server node4. The network information used by a BMC of each node of the four nodes to perform settings on each service node can include a network adapter, a primary IP address, a subnet mask, a default gateway, a virtual IP address, and a method for selecting the chassis administrator. In some embodiments, the setting of the network information of the BMC for Server node1 can include the network adapter as eth0 (MAC aa:bb:cc:dd:ee:11), the primary IP address as 192.168.150.11, the subnet mask as 255.255.255.0, the default gateway as 192.168.150.254, the option "Actively select to become chassis administrator" being checked in the methods for selecting the chassis administrator, and the virtual IP address as 192.168.150.10. Similarly, the setting of the network information of the BMC for Server node2 can include the network adapter as eth0 (MAC aa:bb:cc:dd:ee:22), the primary IP address as 192.168.150.22, the subnet mask as 255.255.255.0, the default gateway as 192.168.150.254, the option "Actively select to become chassis administrator" being checked in the methods for selecting the chassis administrator, and the virtual IP address as 192.168.150.10. The setting of the network information of the BMC for Server node3 can include the network adapter as eth0 (MAC aa:bb:cc:dd:ee:33), the primary IP address as 192.168.150.33, the subnet mask as 255.255.255.0, the default gateway as 192.168.150.254, the option "Actively select to become chassis administrator" being checked in the methods for selecting the chassis administrator, and the virtual IP address as 192.168.150.10. The setting of the network information of the BMC for Server node4 can include the network adapter as eth0 (MAC aa:bb:cc:dd:ee:44), the primary IP address as 192.168.150.44, the subnet mask as 255.255.255.0, the default gateway as 192.168.150.254, the option "Actively select to become chassis administrator" being checked in the methods for selecting the chassis administrator, and the virtual IP address as 192.168.150.10. For all nodes in the chassis, when the chassis administrator is activated, the nodes must have the same subnet as the primary IP address.

As shown in FIG. 3, the system administrator accesses the target node that is selected as the management node through the virtual IP address or the primary IP address.

At 203, the electronic device carries the virtual address in an Address Resolution Protocol (ARP) signaling.

After the electronic device assigns the virtual IP address to the target node, the electronic device can determine the ARP signaling and carry the virtual IP address in the ARP signaling.

At 204, the electronic device transmits the ARP signaling to the subnet corresponding to the to-be-processed chassis, and based on the ARP signaling, instructs other nodes in the to-be-processed chassis except the target node to update the ARP cache information of the other nodes.

The virtual address can be used to inform that the target node is the management node.

In embodiments of the present disclosure, the electronic device can transmit the ARP signaling carrying the virtual IP address to the subnet corresponding to the to-be-processed chassis in a broadcasting method. The other nodes corresponding to the subnet can know that the target node is the management node of the to-be-processed chassis after receiving the virtual IP address. Meanwhile, the operating systems of the other nodes corresponding to the subnet can then update the ARP cache information of the other nodes correspondingly to adapt to the target node as the management node.

At 205, the electronic device reconfigures a web server of the to-be-processed chassis to cause the web server to monitor the virtual address.

In some embodiments, before managing the data in the to-be-processed chassis through the target node, the electronic device may need to monitor the virtual IP address in real-time. The virtual IP address can be monitored through an internal network server of the electronic device to ensure that the virtual IP address is not abnormal. Thus, the target node can smoothly perform the management operation on the to-be-processed chassis.

At 206, the electronic device communicates with the target programmable module of the to-be-processed chassis and manages the data in the to-be-processed chassis through the target node.

At 207, when determining that the virtual address is unavailable, the electronic device attempts multiple communications with the virtual address.

In other embodiments of the present disclosure, if the virtual IP address is currently used or conflicts exist, the virtual IP address can be determined to be currently unavailable. Then, the obtained virtual IP address cannot be assigned to the target node. Instead, multiple communications with the virtual address can be attempted to further and more accurately determine whether the virtual IP address is currently unavailable.

At 208, when the virtual address is not able to be communicated after a first target time length, the electronic device determines that the virtual address is occupied and generates a notification to inform a user that the virtual address is occupied.

In embodiments of the present disclosure, the electronic device can send a connection request to communicate with the virtual IP address to the virtual IP address multiple times. After multiple attempts and when the time length of the multiple attempts exceeds the first target time length, the electronic device can determine that the virtual IP address is occupied. That is, the virtual IP address is currently unavailable. Then, the electronic device can generate a notification indicating that the virtual IP address is occupied (unavailable) and send out the notification to inform the system administrator that the virtual IP address is currently unavailable. The first target time length can be set in advance and can be determined according to historical data.

Although the virtual IP address is currently unavailable based on the determination, and the virtual IP address is not assigned to the target node, the user can still access the management interface of the to-be-processed chassis through the primary IP address of the BMC of the target node.

Figure 4:
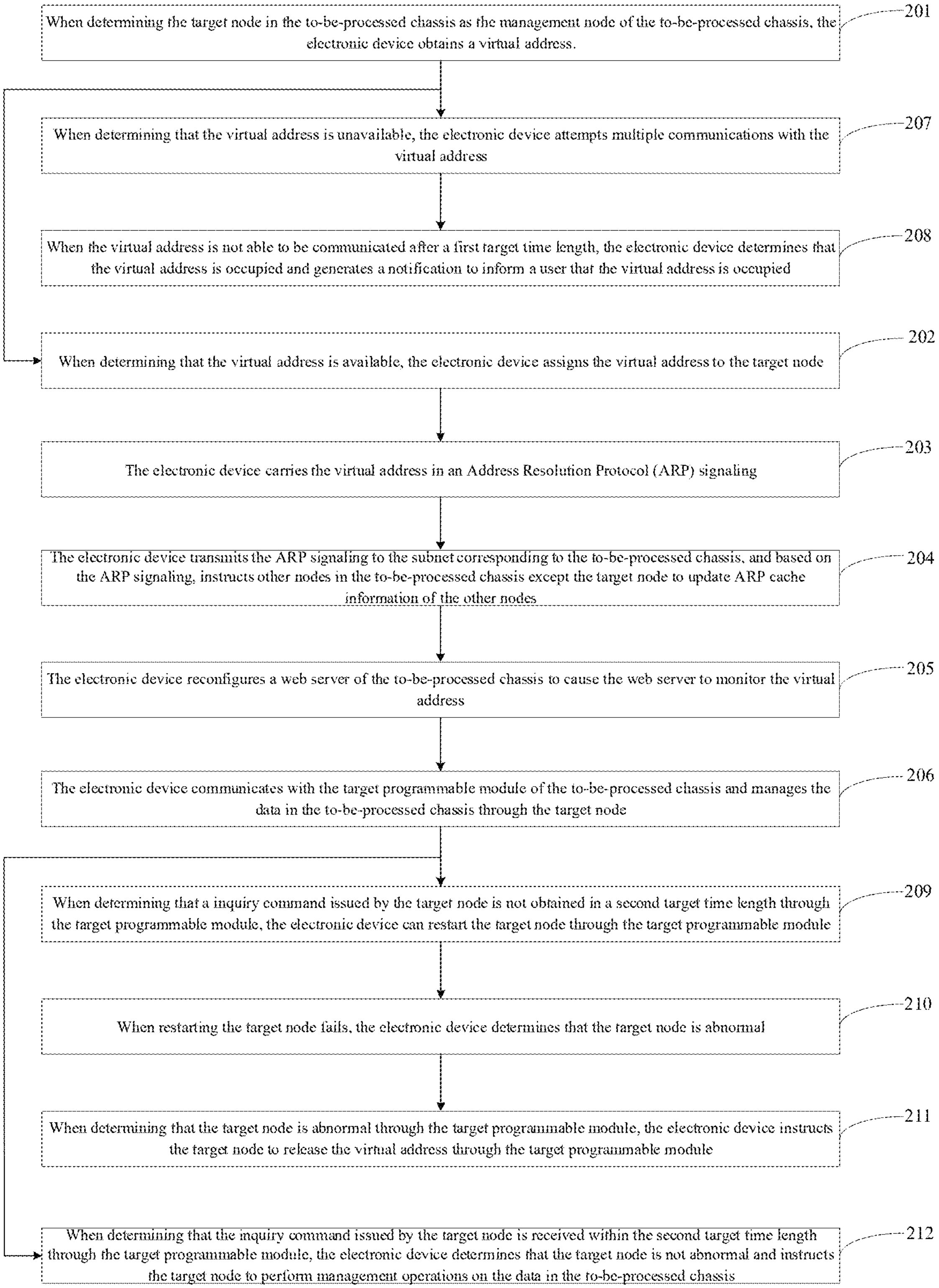
FIG. 4 illustrates a schematic flowchart of another information processing method according to some embodiments of the present disclosure.

In other embodiments of the present disclosure, as shown in FIG. 4, after step 206, the method further includes the following steps.

At 209, when determining that an inquiry command issued by the target node is not obtained in a second target time length through the target programmable module, the electronic device can restart the target node through the target programmable module.

The inquiry command can be used to inquire about the current management node of the to-be-processed chassis.

In some embodiments, the PSoC can determine whether the inquiry command issued by the target node is received within the second target time length. If the inquiry command issued by the target node is not received within the second target time length, the PSoC can determine that the current target node is abnormal (e.g., in a non-activated state). Then, the PSoC can attempt to attempt to restart the target node, i.e., attempt to wake up the target node to be in an activated state. The inquiry command can refer to an I2C command that inquires about which node is the chassis administrator. That is, the inquiry command can be sent via an I2C bus.

The target node in the to-be-processed chassis can send an inquiry command to the PSoC every n seconds. Other nodes in the to-be-processed chassis can also send the inquiry command to the PSoC. n can be determined based on the bandwidth of the BMC of the corresponding node and the bandwidth of the PSoC. The second target time length can be predetermined according to the historical data and can be different from the first target time length and n.

At 210, when restarting the target node fails, the electronic device determines that the target node is abnormal.

In some embodiments, if the target node is not activated after the PSoC performs N times of restart operations, the restart of the target node can be determined to fail. Then, the PSoC can determine that the target node is abnormal. In some embodiments, the PSoC can perform hardware reconfiguration by triggering the BMC of the target node to restart the target node.

At 211, when determining that the target node is abnormal through the target programmable module, the electronic device instructs the target node to release the virtual address through the target programmable module.

In some embodiments, when the PSoC determines that the target node is abnormal, the virtual IP address may need to be released to allow another normal node in the to-be-processed chassis to be assigned with the virtual IP address and to take over the chassis administrator role.

For the inquiry command issued by the BMC, the PSoC may need to provide a corresponding response. If a response message returned by the PSoC indicates that the management node is the PSoC, then the node can become the chassis administrator. If a response message returned by the PSoC indicates that the management node is not the PSoC, if the PSoC used the virtual IP address before, the node can release the virtual IP address.

At 212, when determining that the inquiry command issued by the target node is received within the second target time length through the target programmable module, the electronic device determines that the target node is not abnormal and instructs the target node to perform management operations on the data in the to-be-processed chassis.

In other embodiments of the present disclosure, if the PSoC receives an inquiry command issued by the BMC of the target node within the second target time length, the target node can be indicated to be normal (not abnormal). Then, the PSoC can reply with a corresponding response message to instruct the target node to continue to perform the management operation on the to-be-processed chassis.

After step 206, steps 209 to 211 or steps 212 can be performed.

Figure 5:
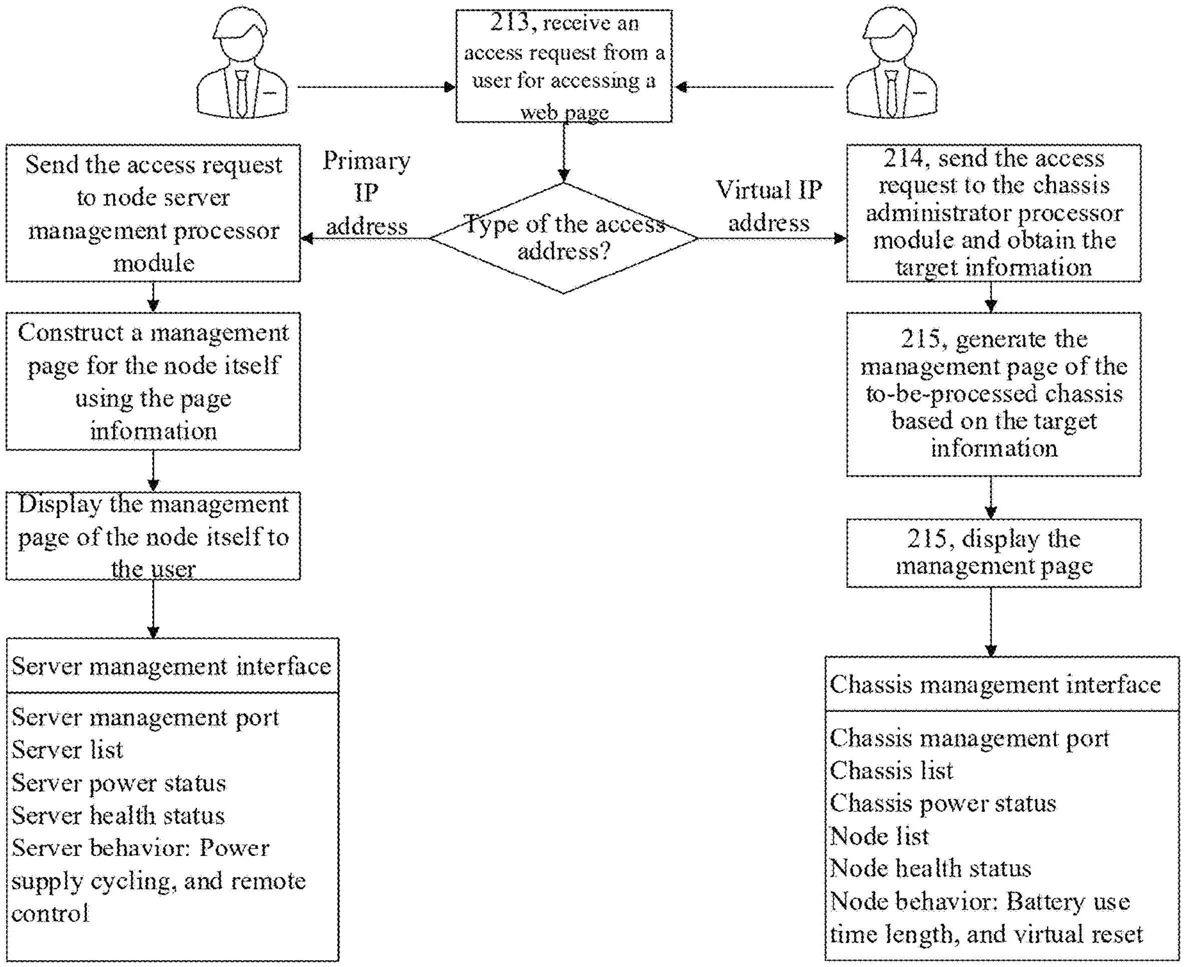
FIG. 5 illustrates a schematic flowchart of another information processing method according to some embodiments of the present disclosure.

In some other embodiments of the present disclosure, as shown in FIG. 5, the method further includes the following steps.

At 213, the electronic device receives an access request from a user for accessing a web page.

The access request can be an access request of the user to obtain web page information. The access request can be generated after the user inputs a corresponding access web address. Moreover, the access address can be received by the network server of the BMC of the target node.

At 214, after determining that the type of access address corresponding to the access request is a virtual address, the electronic device obtains target information corresponding to a management page based on the access request.

The management page can be used to manage the to-be-processed chassis.

In some embodiments, the access address can refer to the access web address used by the user to generate the access request. After receiving the access request, the access request can be sent to a chassis administrator processor module. Then, the chassis administrator processor module can determine the type of the corresponding access address. If the type of the access address is the virtual IP address, the access request can be received through the virtual IP address. Thus, the access request can be used to obtain the management page of the to-be-processed chassis. Then, the target information related to the management page of the to-be-processed chassis can be obtained. The target information can refer to the information used to generate the management page of the to-be-processed chassis.

At 215, the electronic device generates the management page of the to-be-processed chassis based on the target information and displays the management page.

After obtaining the target information, the management page of the to-be-processed chassis can be constructed using the target information. The management page can be then displayed on the display of the electronic device for the user to access.

As shown in FIG. 5, the management page of the chassis includes information about a chassis management port, a chassis list, a chassis power status, a node list, a node health status, a node behavior, a battery life, a virtual reset, etc.

In some other embodiments of the present disclosure, as shown in FIG. 5, if the type of access address is the primary IP address, the access request is indicated to be received through the primary IP address. Then, the access request can be considered to be used to obtain the management page of the node itself. Then, the access request can be sent to the server management processor module, and the server management processor module can obtain the page information related to the management page of the node itself. The page information can refer to the information used to generate the management page of the node itself. After obtaining the page information, the management page (server management interface) of the node itself can be constructed using the page information. The management page of the node itself can be displayed on the display of the electronic device for the user to access.

As shown in FIG. 5, the management page of the node includes information about a server management port, a server list, a server power status, a server health status, a server behavior including power cycling, and remote control, etc.

Figure 6:
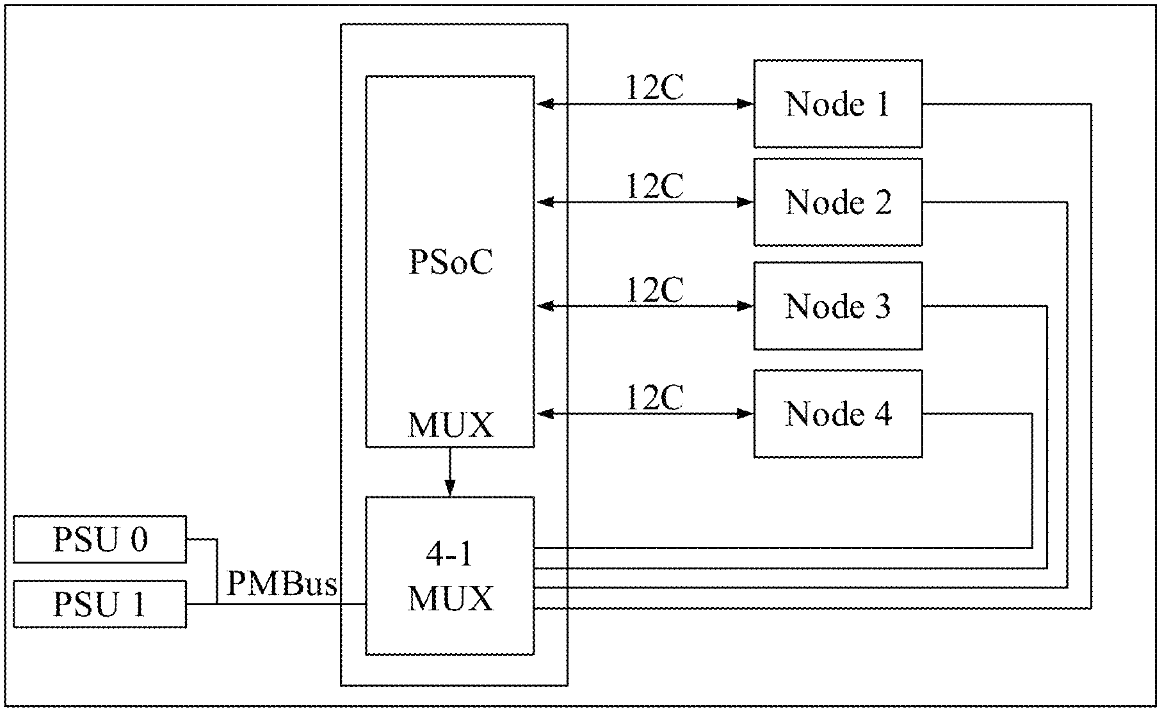
FIG. 6 illustrates a schematic diagram showing an interaction between a target programmable module and a node in a machine chassis of an information processing method according to some embodiments of the present disclosure.

In other embodiments of the present disclosure, as shown in FIG. 6, four nodes in the to-be-processed chassis including Node 1, Node 2, Node 3, and Node 4 perform corresponding information interaction with the PSoC via the I2C bus. Moreover, power can be provided to the node via power modules PSU0 and PSU1 via a PM bus. In some embodiments, one of the two power modules can be selected for power supply.

For the description of the steps and contents of embodiments of the present disclosure the same as other embodiments of the present disclosure, reference can be made to the description of other embodiments of the present disclosure.

In the information processing method of embodiments of the present disclosure, the virtual address can be assigned to the target node, and the virtual address can be notified to the corresponding subnet to notify the other nodes in the subnet that the target node is currently used as the management node. the data of the chassis can be managed based on the target programmable module of the chassis. Thus, the node used as the chassis administrator can seamlessly take over the chassis administrator role and manage the chassis.

Figure 7:
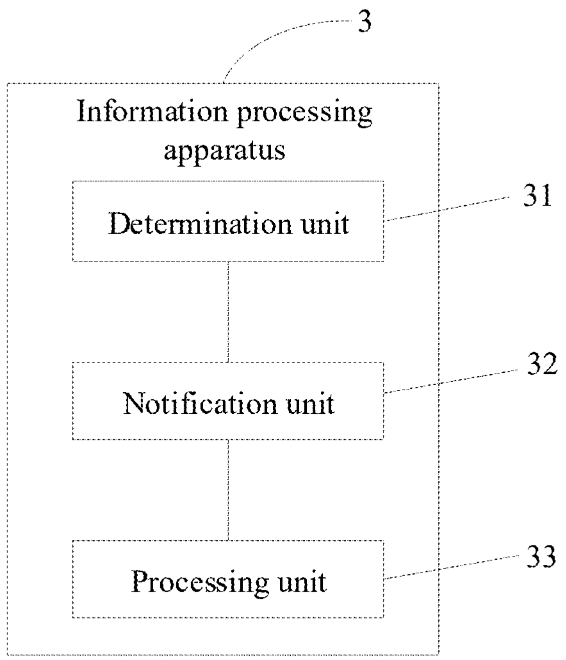
FIG. 7 illustrates a schematic structural diagram of an information processing apparatus according to some embodiments of the present disclosure.

Based on the above, embodiments of the present disclosure provide an information processing apparatus. The information processing apparatus can be applied in the information processing methods of embodiments corresponding to FIG. 1, FIG. 2, and FIG. 4. As shown in FIG. 7, the information processing apparatus 3 includes a determination unit 31, a notification unit 32, and a processing unit 33.

The determination unit 31 can be configured to obtain the virtual address when determining that the target node in the to-be-processed chassis is the management node of the to-be-processed chassis and assign the virtual address to the target node.

The notification unit 32 can be configured to notify the subnet corresponding to the to-be-processed chassis with the virtual address. The virtual address can be used to inform that the target node is the management node.

The processing unit 33 can be configured to communicate with the target programmable module of the to-be-processed chassis through the target node and manage the data in the to-be-processed chassis.

In other embodiments of the present disclosure, the processing unit 33 can be further configured to perform the following steps.

When the inquiry command issued by the target node is determined to be not received within the second target time length through the target programmable module, the target node can be restarted through the target programmable module. The inquiry command can be used to inquire about the current management node of the to-be-processed chassis.

When the restart of the target node fails, the target node is determined to be abnormal.

In other embodiments of the present disclosure, the determination unit 31 can be further configured to assign the virtual address to the target node when determining that the virtual address is available.

In other embodiments of the present disclosure, the notification unit 32 can be further configured to carry the virtual address in the address resolution protocol (ARP) signaling, transmit the ARP signaling to the subnet corresponding to the to-be-processed chassis, and instruct the other nodes except the target node in the to-be-processed chassis to update the ARP cache information of the other nodes based on the ARP signaling.

Correspondingly, the processing unit 33 can be further configured to reconfigure the web server of the to-be-processed chassis to cause the web server to monitor the virtual address.

In other embodiments of the present disclosure, the processing unit 33 can be further configured to perform multiple times of communications with the virtual address when determining that the virtual address is not available, and when the virtual address is not communicated after the first target time length, determine that the virtual address is occupied, and generate the notification to inform the user that the virtual address is occupied.

In other embodiments of the present disclosure, the processing unit 33 can be further configured to determine that the target node is abnormal through the target programmable module and instruct the target node to release the virtual address through the target programmable module.

In other embodiments of the present disclosure, the processing unit 33 can be further configured to, when determining that the inquiry command issued by the target node is received within the second target time length through the target programmable module, determine that the target node is not abnormal, and instruct the target node to perform the management operation on the data of the to-be-processed chassis.

In other embodiments of the present disclosure, the processing unit 33 can be further configured to receive the access request for accessing the web page sent by the user, when determining that the type of the access address corresponding to the access request is the virtual address, obtain the target information corresponding to the management page based on the access request, generate the management page of the to-be-processed chassis based on the target information, and display the management page. The management page can be used to manage the to-be-processed chassis.

For the description of the steps performed by the units, reference can be made to the information processing methods of embodiments corresponding to FIG. 1, FIG. 2, and FIG. 4, which is not repeated here.

In the information processing apparatus of embodiments of the present disclosure, the virtual address can be assigned to the determined target node, and the corresponding subnet can be notified with the virtual address. Then, the other nodes in the subnet can know that the target node is currently used as the management node. Moreover, the data of the chassis can be managed based on the target programmable module of the chassis. Thus, the node used as the chassis administrator can seamlessly take over the chassis administrator role and successfully perform management on the chassis.

Figure 8:
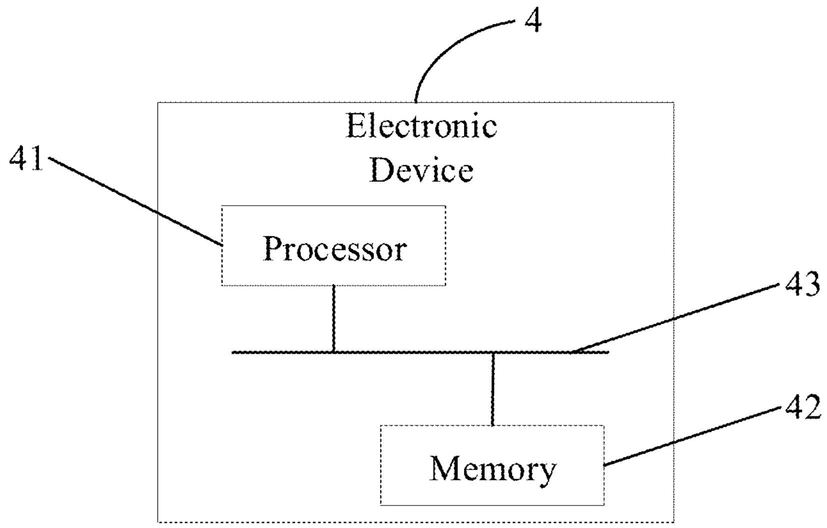
FIG. 8 illustrates a schematic structural diagram of an electronic device according to some embodiments of the present disclosure.

Based on the above, embodiments of the present disclosure provide an electronic device. The electronic device can be applied to the information processing methods of embodiments corresponding to FIG. 1, FIG. 2, and FIG. 4. As shown in FIG. 8, the electronic device 4 includes a processor 41, a memory 42, and a communication bus 43.

The communication bus 43 can be configured to realize the communicative connection between the processor 41 and the memory 42.

The processor 41 can be configured to execute the information processing program stored in the memory 42 to realize the following steps.

When determining that the target node of the to-be-processed chassis is used as the management node of the to-be-processed chassis, the virtual addresses can be obtained and assigned to the target node.

The subnet corresponding to the to-be-processed chassis can be notified with the virtual address. The virtual address can be used to inform that the target node is the management node.

Communication with the target programmable module of the to-be-processed chassis can be performed through the target node, and the data of the to-be-processed chassis can be managed.

In other embodiments of the present disclosure, the processor 41 can be configured to execute the information processing program stored in the memory 42 to realize the following steps.

When determining that the inquiry command issued by the target node is not obtained within the second target time length through the target programmable module, the target node can be restarted through the target programmable module. The inquiry command can be used to inquire about the current management node of the to-be-processed chassis.

When the restart of the target node fails, the target node can be determined to be abnormal.

In other embodiments of the present disclosure, the processor 41 can be configured to execute the information processing program stored in the memory 42 to assign the virtual address to the target node, including when determining that the virtual address is available, assigning the virtual address to the target node.

In other embodiments of the present disclosure, the processor 41 can be configured to execute the information processing program stored in the memory 42 to notify the subnet corresponding to the to-be-processed chassis with the virtual address to carry the virtual address in the Address Resolution Protocol (ARP) signaling, transmit the ARP signaling to the subnet corresponding to the to-be-processed chassis, and instruct the other nodes of the to-be-processed chassis except the target node to update the ARP cache information of the other nodes.

Correspondingly, the processor 41 can be configured to execute the information processing program stored in the memory 42 to reconfigure the web server of the to-be-processed chassis to cause the web server to monitor the virtual address.

In other embodiments of the present disclosure, the processor 41 can be configured to execute the information processing program stored in the memory 42 to, when determining that the virtual address is unavailable, perform communication with the virtual address multiple times, and when the virtual address is not able to be communicated after the first target time length, determine that the virtual address is occupied, and generate a notification used to inform the user that the virtual address is occupied.

In other embodiments of the present disclosure, the processor 41 can be configured to execute the information processing program stored in the memory 42 to, when determining that the target node is abnormal through the target programmable module, instruct the target node to release the virtual address through the target programmable module.

In other embodiments of the present disclosure, the processor 41 can be configured to execute the information processing program stored in the memory 42 to, when determining that the inquiry command issued by the target node is obtained within the second target time length through the target programmable module, determine that the target node is not abnormal, and instruct the target node to perform the management operation on the to-be-processed chassis.

In other embodiments of the present disclosure, the processor 41 can be configured to execute the information processing program stored in the memory 42 to receive the access request sent by the user for web page access, when determining that the type of the access address corresponding to the access request is the virtual address, obtain the target information corresponding to the management page based on the access request, and generate and display the management page of the to-be-processed chassis based on the target information. The management page can be used to manage the to-be-processed chassis.

For the implementation process of the steps executed by the processor of embodiments of the present disclosure, reference can be made to the implementation process of the information processing methods of embodiments corresponding to FIG. 1, FIG. 2, and FIG. 4, which is not repeated here.

In the electronic device of embodiments of the present disclosure, the virtual address can be assigned to the target node, and the corresponding subnet can be notified with the virtual address. Thus, the other nodes in the subnet can know that the target node is currently used as the management node. Moreover, the data of the chassis can be managed based on the target programmable module based on the chassis. Thus, the node used as the chassis administrator can seamlessly take over the chassis administrator role and perform the management on the chassis successfully.

Based on the above, embodiments of the present disclosure provide a computer-readable storage medium. The computer-readable storage medium can store one or more programs that, when executed by one or more processors, cause the one or more processors to implement the information processing methods of embodiments corresponding to FIG. 1, FIG. 2, and FIG. 4.

Those skilled in the art should understand that embodiments of the present disclosure can be provided as a method, a system, or a computer program product. Thus, the present disclosure can be implemented in hardware embodiments, software embodiments, or embodiments in combination with the hardware and the software. The present disclosure can be implemented as a computer program product with one or more computer-readable storage media (including but not limited to a magnetic disc storage device and an optical storage device) storing the computer program codes.

The present disclosure is described with reference to the flowcharts and/or block diagrams of the methods, devices (systems), and computer program products of embodiments of the present disclosure. Each process and/or block of the flowchart and/or the block diagram and a combination of the process and/or the block of the flowchart and/or the block diagram can be implemented by the computer program instructions. The computer program instructions can be provided to a general-purpose computer, a special-purpose computer, an embedded processor, or a processor of another programmable data processing device to generate a machine to cause the instructions executed by the processor of the computer or other programmable data processing device to generate an apparatus configured to implement the functions determined in one or more processes of the flowchart and one or more blocks of the block diagram.

The computer program instructions can also be stored in the computer-readable storage device that can guide the computer or other programmable data processing device to operate in a specific manner to cause the instructions stored in the computer-readable storage device to include a manufactured product including the instruction apparatus. The instruction apparatus can be configured to implement the functions determined in one or more processes of the flowchart and/or one or more blocks of the block diagram.

The computer program instructions can also be loaded to the computer or other programmable data processing devices to cause the computer or the other programmable devices to execute a series of operations to generate the processing implemented by the computer. Then, the instructions executed at the computer or the other programmable devices can provide steps used to implement the functions determined in one or more processes of the flowchart and/or blocks of the block diagram.

The above are merely some embodiments of the present disclosure and are not used to limit the scope of the present disclosure.

What is claimed is:

1. An information processing method comprising:

when determining that a target node in a to-be-processed chassis is used as a management node of the to-be-processed chassis, obtaining a virtual address and assigning the virtual address to the target node;

notifying a subnet corresponding to the to-be-processed chassis with the virtual address, the virtual address being used to inform that the target node is the management node;

performing communication with a target programmable module of the to-be-processed chassis through the target node and management on data of the to-be-processed chassis;

receiving an access request sent by a user for web page access;

when determining that a type of an access address corresponding to the access request is the virtual address, obtaining target information corresponding to a management page based on the access request, the management page being used to manage the to-be-processed chassis; and generating a management page of the to-be-processed chassis based on the target information and displaying the management page.

2. The information processing method according to claim 1, further comprising: when determining that an inquiry command issued by the target node is not obtained within a second target time length through the target programmable module, restarting the target node through the target programmable module, the inquiry command being used to inquire about the current management node of the to-be-processed chassis; and when restarting the target node fails, determining that the target node is abnormal.

3. The information processing method according to claim 1, wherein assigning the virtual address to the target node includes: when determining that the virtual address is available, assigning the virtual address to the target node.

4. The information processing method according to claim 1, wherein notifying the subnet corresponding to the to-be-processed chassis with the virtual address includes: carrying the virtual address in an Address Resolution Protocol (ARP) signaling; transmitting the ARP signaling to the subnet corresponding to the to-be-processed chassis and instructing other nodes in the to-be-processed chassis except the target node to update ARP cache information of the other nodes; and before communicating with the target programmable module of the to-be-processed chassis through the target node, reconfiguring a web server of the to-be-processed chassis to cause the web server to monitor the virtual address.

5. The information processing method according to claim 3, further comprising: when determining that the virtual address is not available, performing communication with the virtual address multiple times; and when the virtual address is not able to be communicated after a first target time length, determining that the virtual address is occupied, and generating a notification used to inform a user that the virtual address is occupied.

6. The information processing method according to claim 1, further comprising: when determining that the virtual address is abnormal through the target programmable module, instructing the target node to release the virtual address through the target programmable module.

7. The information processing method according to claim 2, further comprising: when determining that an inquiry command issued by the target node is obtained within a second target time length through the target programmable module, determining that the target node is not abnormal, and instructing the target node to perform a management operation on data of the to-be-processed chassis.

8. An electronic device comprising:

one or more processors;

one or more memories storing an information processing program that, when executed by the one or more processors, causes the one or more processors to:

when determining that a target node in a to-be-processed chassis is used as a management node of the to-be-processed chassis, obtain a virtual address and assign the virtual address to the target node;

notify a subnet corresponding to the to-be-processed chassis with the virtual address, the virtual address being used to inform that the target node is the management node;

perform communication with a target programmable module of the to-be-processed chassis through the target node and management on data of the to-be-processed chassis;

receive an access request sent by a user for web page access;

when determining that a type of an access address corresponding to the access request is the virtual address, obtain target information corresponding to a management page based on the access request, the management page being used to manage the to-be-processed chassis; and generate a management page of the to-be-processed chassis based on the target information and display the management page; and a bus configured to communicatively connect the one or more processors and the one or more memories.

9. The electronic device according to claim 8, wherein the one or more processors are further configured to: when determining that an inquiry command issued by the target node is not obtained within a second target time length through the target programmable module, restart the target node through the target programmable module, the inquiry command being used to inquire about the current management node of the to-be-processed chassis; and when restarting the target node fails, determine that the target node is abnormal.

10. The electronic device according to claim 8, wherein the one or more processors are further configured to: when determining that the virtual address is available, assign the virtual address to the target node.

11. The electronic device according to claim 8, wherein the one or more processors are further configured to: carry the virtual address in an Address Resolution Protocol (ARP) signaling; transmit the ARP signaling to the subnet corresponding to the to-be-processed chassis and instruct other nodes in the to-be-processed chassis except the target node to update ARP cache information of the other nodes; and before communicating with the target programmable module of the to-be-processed chassis through the target node, reconfigure a web server of the to-be-processed chassis to cause the web server to monitor the virtual address.

12. The electronic device according to claim 11, wherein the one or more processors are further configured to: when determining that the virtual address is not available, perform communication with the virtual address multiple times; and when the virtual address is not able to be communicated after a first target time length, determine that the virtual address is occupied, and generate a notification used to inform a user that the virtual address is occupied.

13. The electronic device according to claim 8, wherein the one or more processors are further configured to: when determining that the virtual address is abnormal through the target programmable module, instruct the target node to release the virtual address through the target programmable module.

14. The electronic device according to claim 9, wherein the one or more processors are further configured to: when determining that an inquiry command issued by the target node is obtained within a second target time length through the target programmable module, determine that the target node is not abnormal, and instruct the target node to perform a management operation on data of the to-be-processed chassis.

15. A non-transitory computer-readable storage medium storing one or more programs that, when executed by one or more processors, cause the one or more processors to:

when determining that a target node in a to-be-processed chassis is used as a management node of the to-be-processed chassis, obtain a virtual address and assign the virtual address to the target node;

notify a subnet corresponding to the to-be-processed chassis with the virtual address, the virtual address being used to inform that the target node is the management node; perform communication with a target programmable module of the to-be-processed chassis through the target node and management on data of the to-be-processed chassis;

receive an access request sent by a user for web page access;

when determining that a type of an access address corresponding to the access request is the virtual address, obtain target information corresponding to a management page based on the access request, the management page being used to manage the to-be-processed chassis; and generate a management page of the to-be-processed chassis based on the target information and display the management page.

16. The non-transitory computer-readable storage medium according to claim 15, wherein the one or more processors are further configured to: when determining that an inquiry command issued by the target node is not obtained within a second target time length through the target programmable module, restart the target node through the target programmable module, the inquiry command being used to inquire about the current management node of the to-be-processed chassis; and when restarting the target node fails, determine that the target node is abnormal.

17. The non-transitory computer-readable storage medium according to claim 16, wherein the one or more processors are further configured to: when determining that the virtual address is available, assign the virtual address to the target node.

18. The non-transitory computer-readable storage medium according to claim 17, wherein the one or more processors are further configured to: carry the virtual address in an Address Resolution Protocol (ARP) signaling; transmit the ARP signaling to the subnet corresponding to the to-be-processed chassis and instruct other nodes in the to-be-processed chassis except the target node to update ARP cache information of the other nodes; and before communicating with the target programmable module of the to-be-processed chassis through the target node, reconfigure a web server of the to-be-processed chassis to cause the web server to monitor the virtual address.

* * * * *